(12) United States Patent
Kopp et al.

(10) Patent No.: US 8,832,106 B2
(45) Date of Patent: Sep. 9, 2014

(54) METHOD OF VISUALIZING CONSUMPTION INFORMATION, CORRESPONDING DEVICE, STORAGE MEANS, AND SOFTWARE PROGRAM THEREFOR

(75) Inventors: Dieter Kopp, Illingen (DE); Martin Dermot Whelan, Melbourne (AU); Catherine Lefevre, Corroy-le-chateau (BE)

(73) Assignee: Alcatel Lucent, Boulogne-Billancourt (FR)

( * ) Notice: Subject to any disclaimer, the term of this patent is extended or adjusted under 35 U.S.C. 154(b) by 94 days.

(21) Appl. No.: 13/146,525

(22) PCT Filed: Dec. 16, 2009

(86) PCT No.: PCT/EP2009/067304
§ 371 (c)(1),
(2), (4) Date: Jul. 27, 2011

(87) PCT Pub. No.: WO2010/086066
PCT Pub. Date: Aug. 5, 2010

(65) Prior Publication Data
US 2011/0289087 A1    Nov. 24, 2011

(30) Foreign Application Priority Data

Jan. 27, 2009 (EP) .................................... 09305070

(51) Int. Cl.
*G06F 17/30* (2006.01)
*G06Q 10/00* (2012.01)

(52) U.S. Cl.
CPC ...................................... *G06Q 10/00* (2013.01)
USPC ........................................................ 707/737

(58) Field of Classification Search
None
See application file for complete search history.

(56) References Cited

U.S. PATENT DOCUMENTS

| 5,836,312 | A | 11/1998 | Moore | |
|---|---|---|---|---|
| 2005/0001837 | A1* | 1/2005 | Shannon | ........................ 345/440 |
| 2010/0070102 | A1* | 3/2010 | Benes et al. | .................. 700/296 |

FOREIGN PATENT DOCUMENTS

| JP | 11-120473 A | 4/1999 |
|---|---|---|
| JP | 2002-324112 A | 11/2002 |
| JP | 2003-014492 A | 1/2003 |
| JP | 2003-162787 A | 6/2003 |
| JP | 2003-240335 A | 8/2003 |
| JP | 2003-316922 A | 11/2003 |

OTHER PUBLICATIONS

International Search Report for PCT/EP2009/067304 dated Feb. 15, 2010.
STC Energy Brochure, "Fully Managed AMR Solutions", STC Energy Solutions Ltd., Chorley, Lancashire, UK, 2 pages.

* cited by examiner

*Primary Examiner* — Belix M Ortiz Ditren
(74) *Attorney, Agent, or Firm* — Fay Sharpe LLP

(57) ABSTRACT

The invention concerns a method of visualizing consumption information, the method comprising the steps of presenting (103) the consumption information to a consumer and presenting (104) to the consumer a benchmark for assessing the consumption information, wherein the method further comprises the steps of, prior to presenting (104) the benchmark, determining (101) a peer group of consumers based on a characteristic of the consumer and determining (102) the benchmark based on the peer group. The invention further concerns a corresponding device, storage means, and software program therefor.

20 Claims, 1 Drawing Sheet

100

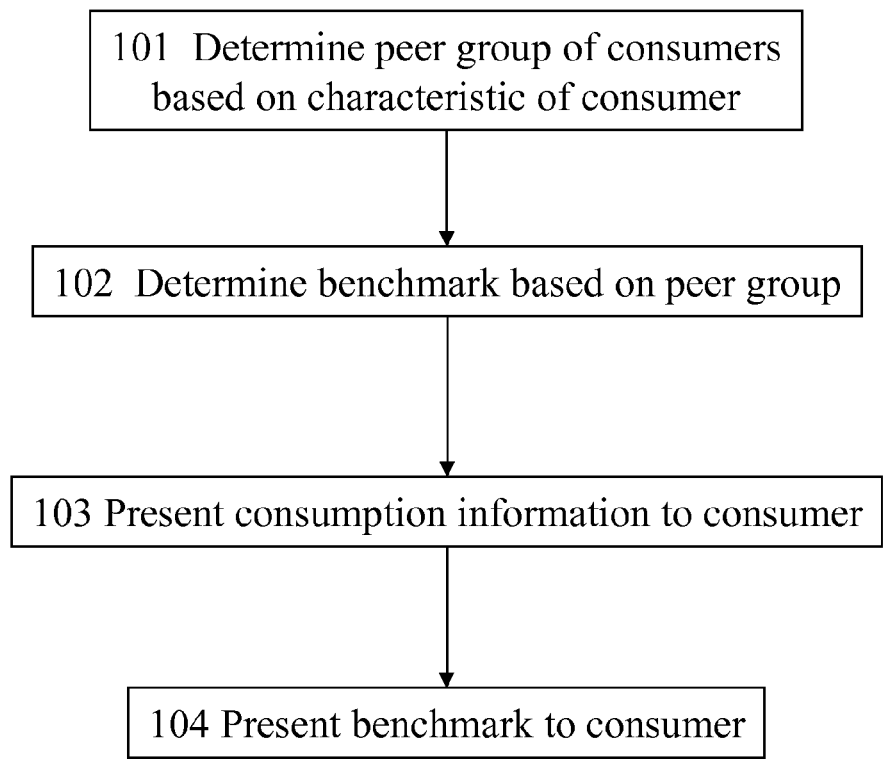

METHOD OF VISUALIZING CONSUMPTION INFORMATION, CORRESPONDING DEVICE, STORAGE MEANS, AND SOFTWARE PROGRAM THEREFOR

The invention relates to a method of visualizing consumption information according to the preamble of claim 1, a device according to the preamble of claim 8, storage means according to the preamble of claim 9, and a software program according to the preamble of claim 10.

By a smart meter is meant a type of advanced meter, such as an electrical meter, that identifies consumption in more detail than a conventional meter and optionally, but generally, communicates that information via some network back to a local utility for monitoring and billing purposes. The method of remotely measuring and reporting consumption is also known as telemetering. The term "smart meter" often refers to an electrical meter, but in this context is meant to refer to any utility such as, inter alia, electrical energy, natural gas, and water consumption. Smart meters are commonly believed to be a less costly alternative to traditional interval or time-of-use meters and are intended to be used on a wide scale with all customer classes, including residential customers. The A3 ALPHA® Meter/Collector developed by Elster Electricity, LLC, is an example of a smart meter.

Recently, a number of initiatives have evolved that aim to establish a standardized platform for smart meters to be shared among utility providers. One such initiative is the non-profit organization digitalSTROM Alliance founded by the Swiss Federal Institute of Technology in Zurich, Switzerland. Another is the task force "Smart Metering", which is currently formed by the Association for Electrical, Electronic, and Information Technologies (VDE) in Frankfurt, Germany. The European Smart Metering Industry Group (ESMIG) and European Telecommunications Standards Institute (ETSI) both pursue the goal of developing a European standard for smart meters. Eventually, at least one of these bodies may be expected to present a specification that will gain recognition across the industry.

A universally accepted method for visualizing consumption information remains to be seen. However, several vendors of energy efficiency software have emerged and established custom utility reports. One such software suite is EnergyCAP Enterprise by Good Steward Software, LLC. A monthly comparison report created by EnergyCAP comprises, in addition to the monthly utility consumption in the current year, the corresponding consumption in a distinct base year for use as a reference.

A downside of the aforementioned method is its inability to provide the consumer with a meaningful benchmark for comparing his personal consumption to a representative baseline. As an example, the conventional report described above does not indicate whether the cumulative consumption diverges from a standard value that may be applied to the consumer's household. It is thus an object of the invention to provide the consumer with an adequate reference for assessing his specific utility use, thus enabling him to take corrective action in case of a deviation.

This object is achieved by a method according to claim 1, a device according to claim 8, storage means according to claim 9, and a software program according to claim 10.

A main idea of the invention is to determine a suitable peer group, taking into account one or more characteristics of the consumer at hand. This peer group serves as a basis for establishing the benchmark which is ultimately presented to the customer.

Further developments of the invention can be gathered from the dependent claims and the following description.

In the following the invention will be explained further making reference to the attached drawing.

To visualize consumption information according to an embodiment of the invention, a characteristic of a specific consumer is used to establish a peer group of consumers. Once the peer group is determined, a benchmark is derived which is based on the peer group. Finally, both the consumption information and the benchmark are presented to the consumer.

FIG. 1 shows a flowchart depicting a method according to an embodiment of the invention.

In the following, a method according to the invention is elucidated by way of example, referencing FIG. 1.

The flowchart 100 of FIG. 1 comprises a first step 101, a second step 102, a third step 103, and a fourth step 104, mutually connected by arrows indicating a preferred order of execution.

To allow its execution by means of a programmable device, the method of FIG. 1 is implemented in the form of a software program.

In a preliminary step (not depicted), a utility meter is used to identify a cumulative consumption of a utility. On this basis, consumption information is gathered for monitoring and billing purposes. To allow the meter to communicate this information back to a utility provider, the meter takes the form of a smart meter. If the utility is electricity and advanced requirements such as load adjustment or demand response support are imposed on the distribution network, this network takes the form of a smart power grid. In this context, "smart grid" is used as an aggregate term for a set of related technologies that aim to provide greater resilience to loading, a decentralization of power generation, or price signaling to consumers. A further benefit of using a smart grid is its integrated communications, which may be used to transmit the consumption information from the smart meter to the utility, that is, electricity provider. To this end, inter alia, wireless mesh networks, power-line carrier communications (PLC), or fiber-optics may be used in conjunction with an embodiment of the invention. IEC TC57 has created a family of international standards that can be used as part of a smart grid. These standards include IEC 61850, which is an architecture for substation automation, and IEC 61970/61968, also known as the Common Information Model (CIM). CIM provides for standardized semantics to be used in smart grid communications.

To adequately support an arbitrary number of households, the utility provider naturally monitors the cumulative consumption of not only a single consumer, but a multitude of consumers at various endpoints of its distribution network. To store the corresponding consumption information persistently, the utility provider maintains a database with sufficient capacity to accumulate this information over a prolonged period of time. The software program implementing the method of FIG. 1 is configured to connect to this database and authorized to read the data contained therein.

In the first step 101, the software program determines a peer group of consumers based on a characteristic of the consumer. For adaptation to the preferences expressed by the consumer, the characteristic employed is selectable and depends on master data accessible by the utility provider. For this reason, at least part of the master data administered for each consumer should be made available to the software program. Aiming to consolidate the required storage resources, the embodiment at hand maintains both the consumption data and the master data in the same database.

To account for domestic circumstances of the consumer, the characteristic feature may be, inter alia, a number of cohabitants of the consumer, his or her type of domicile, or the number of rooms of that domicile. Furthermore, considering the square footage to be served, the characteristic may be formed by a living, retail, or garden space of the consumer or a sum thereof. Finally, to reflect specific energy demands of the consumer, his or her heating, ventilation or air-conditioning technology may serve as the characteristic feature. The software program allows selecting an arbitrary combination of the above-mentioned characteristics to further increase the granularity of the peer group. In this case, the peer group is determined based on the desired combination of characteristics, such as the subset of households featuring three inhabitants and a medium-sized garden.

In the second step 102, the software program utilizes its database to determine a benchmark for assessing the consumption information based on the peer group. To derive an expected consumption by the consumer, taking into account the characteristics of the first step 101, the benchmark is determined by calculating an average consumption of all consumers that constitute the peer group. This average may take the form of an arithmetic mean of the consumptions encountered in the peer group, that is, the sum of all these consumptions divided by the number of consumers in the peer group. In mathematics and statistics, this type of arithmetic mean is also called a population mean. In an alternative embodiment, to limit the number of summands and thus reduce the computing resource requirements, a statistical sample of consumers is drawn from the peer group, and the arithmetic mean is based on the consumptions of only those consumers. The arithmetic mean in this case thus takes the form of a sample mean.

If the data structure in which the software programs stores the consumptions of the peer group takes the form of a sorted array, an alternative embodiment may make use of a median instead of the arithmetic mean to derive the average to be used as a benchmark. In a sorted array, the median can substantially be found in constant time by a lookup operation on the middle index of the array.

To allow for a flexible visualization, the software program allows the consumer to choose the measuring period over which the average is calculated. This measurement period ends on the current date or shortly before and spans the preceding year, month, or day, depending on a preference of the consumer. As the measurement period moves with the current date, it is commonly called a sliding window. A specific benefit of determining the average over a sliding window is the ability of the software program to perform the calculation on demand, that is, on request by the consumer, as opposed to batch processing at the end of a billing cycle. This is especially advantageous where the software program is interactive. In computer science, interactive refers to software which accepts and responds to input from humans, for example, data or commands.

In the third step 103, the software program presents the consumption information to the consumer. Similarly, in the fourth step 104, the software program presents the benchmark to the consumer. To allow for convenient access to the visualization, both the consumption information and the benchmark are displayed as part of a web page. That web page is generated by the software program in response to a request for consumption information and may be associated with a web portal as hosted by many utility providers. An example of a conventional web portal for on-demand access to energy consumption information gathered through a smart meter is provided by STC Energy Solutions Ltd. in the leaflet available via the Internet at http://www.stcenergy.co.uk/PDFs/AMR%20leaflet%20Oct%2007.pdf.

To further integrate the visualization with the utility provider's accounting and billing, the web page is integrated with an online invoicing system.

For an improved user experience, the software program displays both figures by means of a bar chart, sometimes called a bar graph. Depending on the amount consumed relative to the benchmark, an additional graphical symbol is presented to provide immediate feedback, for example, a smiling face in case of below-average power consumption and a frowning face in case of above-average power consumption. An additional benefit of this type of visualization is the motivation of the consumer to conserve resources, such as energy, brought about by the incentive to obtain a positive consumption report. This incentive not only serves to reduce the consumer's utility bill, but also to demonstrate the utility provider's green credentials.

To further visualize a trend in the consumption information over intervals of time, an alternative embodiment may utilize a line chart, sometimes called a line graph, drawing one chronological line for each of the two quantities. Yet another embodiment, to minimize the need for computing resources and bandwidth, may simply display the figures numerically without providing any graphical representation.

The method is implemented in a preferred embodiment through or together with a software program written in e.g. Very high speed integrated circuit Hardware Description Language (VHDL) or C, C++, Java, or using another programming language, or implemented by one or more VHDL, C, C++, or Java processes or routines, or several software modules being executed on at least one hardware device. Alternatively, the method is implemented in hardware only, e.g. making use of an ASIC. The described embodiments are to be considered in all respects only as illustrative and not restrictive. Furthermore, the order of the steps for performing the invention is not critical, and as can be understood by those skilled in the art, the order may vary without departing from the scope of the invention.

The programmable device can be any kind of device which can be programmed including e.g. any kind of computer like a server or a personal computer, an FPGA, a processor, or the like, or any combination thereof, e.g. one processor and two FPGAs.

The storage means could be any kind of data repository in any storage medium such as a CD or disk, e.g. USB memory stick or any kind of memory, e.g. at least one RAM or ROM, or the like, or any combination thereof, e.g. one ROM and two RAMs, or two disks, etc.

The software program is a set of instructions which could have been created using JAVA, C, C++, HTML, LISP, or another programming language.

The invention claimed is:

1. A method of visualizing consumption information associated with a consumer, comprising:
   determining a peer group of consumers for a specific consumer from a multitude of consumers at a programmable device, the peer group based at least in part on at least one selectable characteristic of the specific consumer and determined by processing consumer characteristics stored in a consumer data repository for at least a portion of the multitude of consumers;
   determining a benchmark related to a select consumption information associated with the specific consumer at the programmable device, the benchmark based on the select consumption information and corresponding consumption information associated with the peer group, the select and corresponding consumption information being stored in a consumption data repository; and generating a visualization of the benchmark and the select consumption information at the programmable device, the visualization configured for display to the specific consumer via a web page.

2. A method according to claim 1, wherein the benchmark is determined by calculating an average of the corresponding consumption of information for at least a sample of consumers in the peer group.

3. A method according to claim 2, wherein the average of the corresponding consumption information is calculated over a preceding measurement period relative to a point in time when the visualization is generated and defined by a sliding window over essentially either of the following:
   a preceding year,
   a preceding month, and
   a preceding day.

4. A method according to claim 1, wherein the consumption information includes a cumulative consumption measurement of a utility consumed by the corresponding consumer, wherein the corresponding cumulative consumption measurement is provided by a utility meter and maintained by a utility provider in the consumption data repository.

5. A method according to claim 1, further comprising:
   reading the corresponding consumption information from a consumption database stored in the consumption data repository.

6. A method according to claim 1, wherein the peer group of consumers is determined based on at least one of the following:
   a number of cohabitants of the consumer,
   a type of domicile of the consumer,
   a room count of the consumer,
   a living space of the consumer,
   a retail space of the consumer,
   a garden space of the consumer,
   a heating technology employed by the consumer,
   a ventilation technology employed by the consumer, and
   an air-conditioning technology employed by the consumer.

7. A programmable device for visualizing consumption information associated with a consumer, comprising:
   a peer processor configured to determine a peer group of consumers for a specific consumer from a multitude of consumers, the peer group based at least in part on at least one selectable characteristic of the specific consumer and determined by processing consumer characteristics stored in a consumer data repository for at least a portion of the multitude of consumers;
   a benchmark processor configured to determine a benchmark related to a select consumption information associated with the specific consumer, the benchmark based on the select consumption information and corresponding consumption information associated with the peer group, the select and corresponding consumption information being stored in a consumption data repository; and
   a visualization processor configured to generate a visualization of the benchmark and the select consumption information, the visualization configured for display to the specific consumer via a web page.

8. A non-transitory computer readable medium storing program instructions that, when executed by a computer, cause a corresponding programmable device to perform a method of visualizing consumption information associated with a consumer, the method comprising:
   determining a peer group of consumers for a specific consumer from a multitude of consumers at a programmable device, the peer group based at least in part on at least one selectable characteristic of the specific consumer and determined by processing consumer characteristics stored in a consumer data repository for at least a portion of the multitude of consumers;
   determining a benchmark related to a select consumption information associated with the specific consumer at the programmable device, the benchmark based on the select consumption information and corresponding consumption information associated with the peer group, the select and corresponding consumption information being stored in a consumption data repository for at least the peer group of consumers; and
   generating a visualization of the benchmark and the select consumption information at the programmable device, the visualization configured for display to the specific consumer via a web page.

9. The method according to claim 1, further comprising:
   reading the consumer characteristics from master data for the multitude of consumers stored in the consumer data repository.

10. The programmable device according to claim 7, wherein the benchmark is determined by calculating an average of the corresponding consumption information for at least a sample of consumers in the peer group.

11. The programmable device according to claim 10, wherein the average of the corresponding consumption information is calculated over a preceding measurement period relative to a point in time when the visualization is generated and defined by a sliding window over essentially either of the following:
   a preceding year,
   a preceding month, and
   a preceding day.

12. The programmable device according to claim 7, wherein the consumption information includes a cumulative consumption measurement of a utility consumed by the corresponding consumer, wherein the corresponding cumulative consumption measurement is provided by a utility meter and maintained by a utility provider in the consumption data repository.

13. The programmable device according to claim 7, wherein the benchmark processor is configured to read the corresponding consumption information from a consumption database stored in the consumption data repository.

14. The programmable device according to claim 7, wherein the peer processor is configured to read the consumer characteristics from master data for the multitude of consumers stored in the consumer data repository.

15. The programmable device according to claim 7, wherein the peer group of consumers is determined based on at least one of the following:
   a number of cohabitants of the consumer,
   a type of domicile of the consumer,
   a room count of the consumer,
   a living space of the consumer,
   a retail space of the consumer,
   a garden space of the consumer,
   a heating technology employed by the consumer,
   a ventilation technology employed by the consumer, and
   an air-conditioning technology employed by the consumer.

16. A system for visualizing consumption information associated with a consumer, comprising:

a display device configured to display visualized consumption information associated with a specific consumer in a web page; and a programmable device configured to generate the visualized consumption information, the programmable device comprising:

a peer processor configured to determine a peer group of consumers for the specific consumer from a multitude of consumers, the peer group based at least in part on at least one selectable characteristic of the specific consumer and determined by processing consumer characteristics stored in a consumer data repository for at least a portion of the multitude of consumers;

a benchmark processor configured to determine a benchmark related to a select consumption information associated with the specific consumer, the benchmark based on the select consumption information and corresponding consumption information associated with the peer group, the select and corresponding consumption information being stored in a consumption data repository; and a visualization processor configured to generate the visualized consumption information for display of the benchmark and the select consumption information to the specific consumer on the display device in the web page.

17. The system according to claim 16, wherein the benchmark is determined by calculating an average of the corresponding consumption information for at least a sample of consumers in the peer group.

18. The system according to claim 16, wherein the consumption information includes a cumulative consumption measurement of a utility consumed by the corresponding consumer, wherein the corresponding cumulative consumption measurement is provided by a utility meter and maintained by a utility provider in the consumption data repository.

19. The system according to claim 16, wherein the benchmark processor is configured to read the corresponding consumption information from a consumption database stored in the consumption data repository.

20. The system according to claim 16, wherein the peer processor is configured to read the consumer characteristics from master data for the multitude of consumers stored in the consumer data repository.

* * * * *